(12) United States Patent
Chupka et al.

(10) Patent No.: US 9,708,747 B2
(45) Date of Patent: Jul. 18, 2017

(54) ASSEMBLY AND METHOD FOR SHIFTING BETWEEN MODES OF OPERATION FOR A WASHING MACHINE APPLIANCE

(75) Inventors: Edward Simeon Chupka, Bardstown, KY (US); Stephen Bernard Froelicher, Shepherdsville, KY (US); Jeffrey Lynn Jessie, Taylorsville, KY (US); Richard D. Suel, II, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 907 days.

(21) Appl. No.: 13/613,752

(22) Filed: Sep. 13, 2012

(65) Prior Publication Data

US 2014/0069145 A1 Mar. 13, 2014

(51) Int. Cl.
*D06F 37/40* (2006.01)
*H02K 7/108* (2006.01)

(52) U.S. Cl.
CPC ............ *D06F 37/40* (2013.01); *H02K 7/108* (2013.01)

(58) Field of Classification Search
CPC ......... D06F 37/40; D06F 37/304; D06F 23/04
See application file for complete search history.

(56) References Cited

U.S. PATENT DOCUMENTS

| | | | |
|---|---|---|---|
| 4,556,827 A * | 12/1985 | Erdman | H02P 6/085 318/400.22 |
| 5,168,187 A * | 12/1992 | Baer | H02K 1/2793 310/185 |
| 5,301,523 A * | 4/1994 | Payne | D06F 37/203 318/368 |
| 5,353,613 A * | 10/1994 | Smith | D06F 37/304 68/23.7 |
| 5,551,262 A | 9/1996 | Seo | |
| 5,737,944 A | 4/1998 | Nishimura et al. | |
| 6,202,452 B1 | 3/2001 | Ura et al. | |
| 6,332,343 B1 * | 12/2001 | Koketsu | D06F 37/304 68/12.02 |
| 7,082,792 B2 | 8/2006 | Ahn | |
| 7,171,715 B2 | 2/2007 | Yoon et al. | |
| 7,409,737 B2 * | 8/2008 | Cho | D06F 37/40 68/12.24 |
| 7,418,841 B2 | 9/2008 | Yoon et al. | |
| 7,518,280 B2 * | 4/2009 | Ley | D06F 37/304 310/185 |
| 2010/0283414 A1* | 11/2010 | Jun | D06F 37/304 318/400.02 |
| 2011/0023239 A1* | 2/2011 | Lee | D06F 35/005 8/137 |
| 2012/0137738 A1* | 6/2012 | Lee | D06F 21/08 68/12.24 |

* cited by examiner

*Primary Examiner* — Joseph L Perrin
*Assistant Examiner* — Irina Graf
(74) *Attorney, Agent, or Firm* — Dority & Manning, P.A.

(57) ABSTRACT

A washing machine appliance and a method of operation thereof are provided for shifting between different modes such as wash, rinse, and/or spin modes. A clutch is used to shift between the different modes of operation. Alignment of the clutch, particularly the clutch teeth, is provided so as to allow for proper engagement of the clutch and motor or to properly align the clutch teeth for disengagement and locking with locking teeth carried upon e.g., a platform lock.

12 Claims, 12 Drawing Sheets

ASSEMBLY AND METHOD FOR SHIFTING BETWEEN MODES OF OPERATION FOR A WASHING MACHINE APPLIANCE

FIELD OF THE INVENTION

The subject matter of the present disclosure relates generally to a method and assembly for switching a washing machine appliance between certain modes of operation.

BACKGROUND OF THE INVENTION

Washing machines are typically equipped to operate with one or more modes or cycles such as wash, rinse, and spin modes. During a wash or rinse mode for a vertical axis washing machine, the laundry articles are usually submerged at least partially within a wash or rinse fluid while an agitator is used to impart motion to the laundry articles that are contained within a wash basket. A wash tub contains the fluid, agitator, and wash basket.

During a wash or rinse mode, the wash basket remains stationary while the agitator rotates to impart movement to the laundry articles. During a spin mode, typically both the agitator and the wash basket are rotated so as to subject the articles in the laundry to centrifugal forces. These forces cause water and other fluids to be wrung from the clothes. These liquids can exit the wash basket through holes positioned along the outer wall of the wash basket for subsequent removal from the wash tub.

For operation of the washing machine appliance between the wash, rinse, and spin modes, it is desirable to independently control the movement of the agitator and wash basket. More specifically, during the wash and rinse modes, the wash basket may be held stationary while the agitator is rotated so as to impart movement to the laundry articles. During the spin mode, however, rotation of the wash basket is required to wring liquid from the articles as set forth above.

In order to control the rotation of the agitator and wash basket, a vertical axis washing machine can be equipped with e.g., a clutch for engaging and disengaging the wash basket from a motor that can be used to rotate the agitator and/or wash basket. As the washing machine executes a cleaning process, the clutch is operated at certain times in order to provide the desired movement of the agitator and wash basket during one or more wash, rinse, and/or spin cycles. To prevent damage to the appliance, proper engagement and disengagement of the clutch during operation is desirable.

Certain challenges are presented in properly engaging and disengaging the clutch. By way of example, once a wash, rinse, or spin cycle is completed, clothes or other articles in the wash basket can place a torque on wash basket and/or agitator. In turn, this torque is transferred against the clutch and can increase the friction that must be overcome to shift or move the clutch. A spring or other positioning mechanism may not be able to provide enough force against the clutch to overcome this friction.

Thus, in order to free the clutch, the motor can be jogged or bumped. More specifically, the motor can be energized for a short period of time to partially move the rotor in an effort to release the clutch. However, after the clutch is released, its position relative to e.g., to other components may change because the clutch may rotate after it is released. Furthermore, the amount of rotation may vary each time this procedure is used to free the clutch. As a result of this rotation, the clutch may no longer be properly aligned for receipt by e.g., a platform lock or other holding feature of the appliance. A similar problem may occur when attempting to reengage the clutch with the motor-i.e. after jogging, the clutch may not be properly aligned to engage the motor.

The failure to properly align the clutch when attempting to shift it between various modes of operation can cause damage to the appliance such as e.g., destroying the clutch and/or other components of the appliance. For example, if the clutch is not properly engaged with the motor and a spin cycle is initiated, the clutch may attempt to engage after the motor has reached high speed. At the moment of this attempt, all of the rotational inertia of the loaded wash basket is encountered by the motor, which generally will result in damage to the appliance.

Accordingly, a washing machine appliance that can shift between various modes or cycles of operation would be useful. More particularly, a mechanism or assembly for positioning the clutch of a washing machine appliance so as to determine the relative motion of the agitator and wash basket between various modes of operation would be beneficial. Such a mechanism that can be operated in a manner that provides for proper alignment of the clutch when engaging or disengaging the clutch from the motor would be particularly useful.

BRIEF DESCRIPTION OF THE INVENTION

The present invention provides a washing machine appliance and a method of operation thereof for shifting between different modes such as wash, rinse, and/or spin modes. A clutch is used to shift between the different modes of operation. Alignment of the clutch, particularly the clutch teeth, is provided so as to allow for proper engagement of the clutch and motor or to properly align the clutch teeth for disengagement and locking with locking teeth carried upon e.g., a platform lock. Additional aspects and advantages of the invention will be set forth in part in the following description, or may be apparent from the description, or may be learned through practice of the invention.

In one exemplary aspect, the present invention provides a method for operating a washing machine appliance. The method includes the steps of providing a motor that is rotatable about an axis of rotation, the motor having a stator and a rotor; providing a clutch having a first plurality of clutch teeth along one side and a second plurality of clutch teeth along an opposing side; energizing at least one coil of the stator so as to rotate and hold the rotor at a position where the coil is aligned with at least one magnet carried by the rotor; aligning a plurality of rotor teeth on the rotor with the first plurality of clutch teeth; and sliding the clutch along the axis of rotation of the motor so as to properly engage the first of plurality of clutch teeth with the plurality of rotor teeth.

In another exemplary aspect, the present invention provides a method for operating a washing machine appliance. The appliance has a motor that includes a stator and a rotor having rotor teeth. The appliance has a clutch that includes clutch teeth and is slidable along an axis of rotation defined by a shaft connected to the rotor. The method includes the steps of energizing one or more coils of the stator so as to position one or more coils relative to one or more magnets positioned on the rotor and thereby align the clutch teeth with the rotor teeth; and sliding the clutch along the axis of rotation so as to engage the clutch teeth and the rotor teeth.

In still another exemplary aspect, a method for operating a washing machine appliance is provided. The appliance includes locking teeth having a fixed position, a motor having a stator and a rotor, and a clutch that includes clutch teeth and that is slidable along an axis of rotation defined by the rotor. The method includes the steps of energizing one or more coils of the stator so as to position such one or more coils relative to one or more magnets positioned on the rotor and thereby align the clutch teeth with the locking teeth; and sliding the clutch along the axis of rotation so as to engage the clutch teeth with the locking teeth.

In an exemplary embodiment, the present invention provides a washing machine appliance. The appliance includes a wash tub for the receipt of laundry articles and fluid for cleaning. A wash basket is received into the wash tub. The wash basket is configured for retaining the laundry articles. An agitator is positioned in the wash basket. The agitator is configured for imparting motion to the articles within the wash basket. A motor is provided for selectively rotating one or both of the agitator and the wash basket about an axis of rotation. The motor includes a rotor having a plurality of magnets circumferentially positioned about the rotor and having a plurality of rotor teeth and a stator having a plurality of coils circumferentially positioned about the stator. An agitator drive element is connected to the agitator and driven by the rotation of the motor. A wash basket drive element is connected to the wash basket and is configured for selective rotation by the motor. A clutch is provided having a first plurality of clutch teeth along one side and a second plurality of clutch teeth along an opposing side. The clutch is configured for shifting movement along the wash basket drive element so as to selectively position the clutch between i) an engaged position in which the clutch connects the motor and the wash basket drive element so that both the agitator and the wash basket are rotated by the motor, and ii) a disengaged position in which the clutch disconnects the motor and the wash basket drive element such that the agitator is rotated while the rotation of the wash basket is prevented. A clutch positioning assembly is in contact with the clutch and configured for shifting the clutch between the engaged position and the disengaged position. A controller is provided that is in communication with the clutch and the motor. The controller is configured for energizing at least one coil of the stator so as to rotate and hold the rotor at a position where the at least one coil is aligned with at least one magnet carried by the rotor and where the plurality of rotor teeth are aligned with the first plurality of clutch teeth; and activating the clutch positioning assembly so as to slide the clutch along the axis of rotation of the motor to the engaged position where the first of plurality of clutch teeth are engaged with the plurality of rotor teeth.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 3 is a cross-sectional view of an exemplary embodiment of a motor, shaft, and clutch as may be used in the washing machine of FIGS. 1 and 2. In FIG. 3, the clutch is shown in a mode that prevents the wash basket from rotating.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
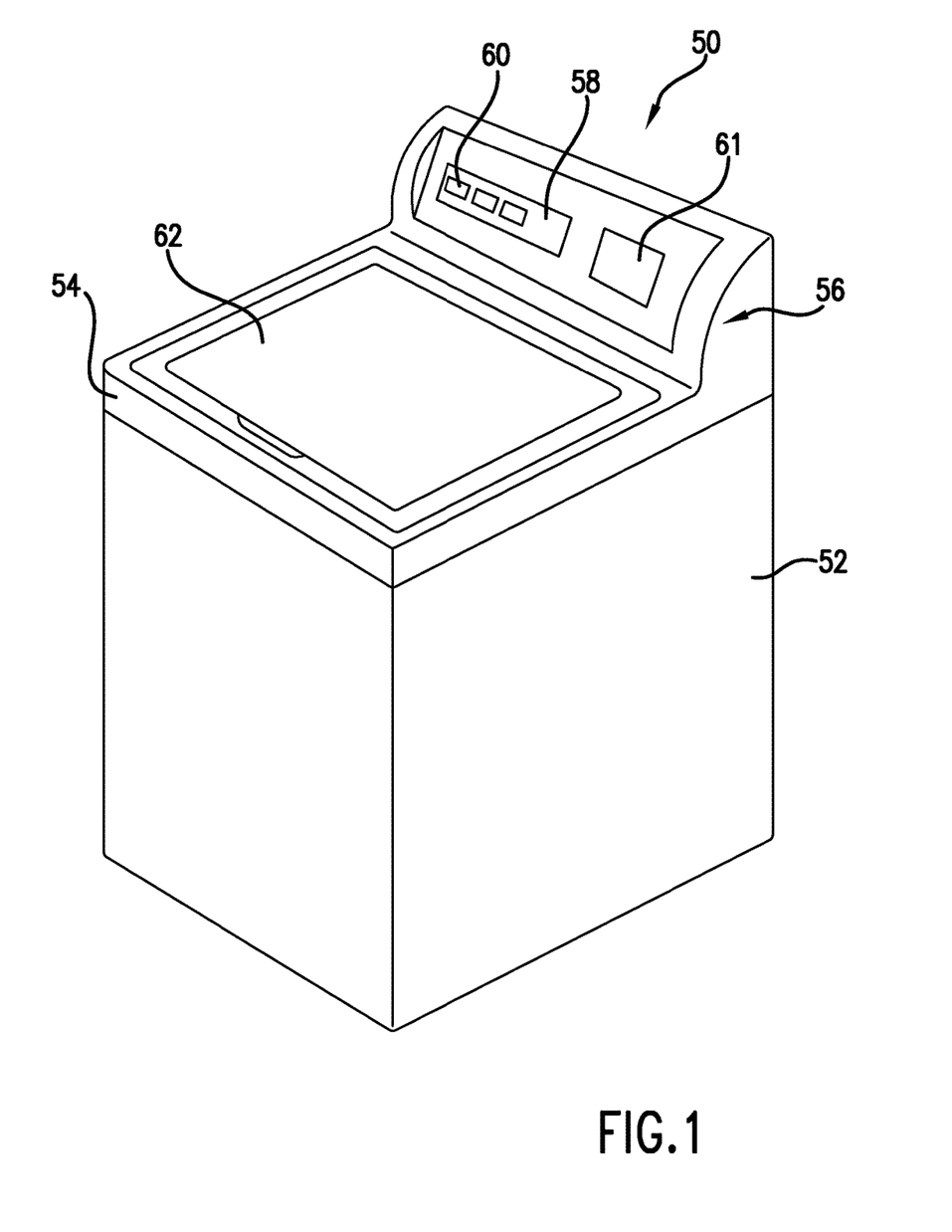
FIG. 1 provides a perspective view of an exemplary embodiment of a washing machine appliance of the present invention.
Figure 2:
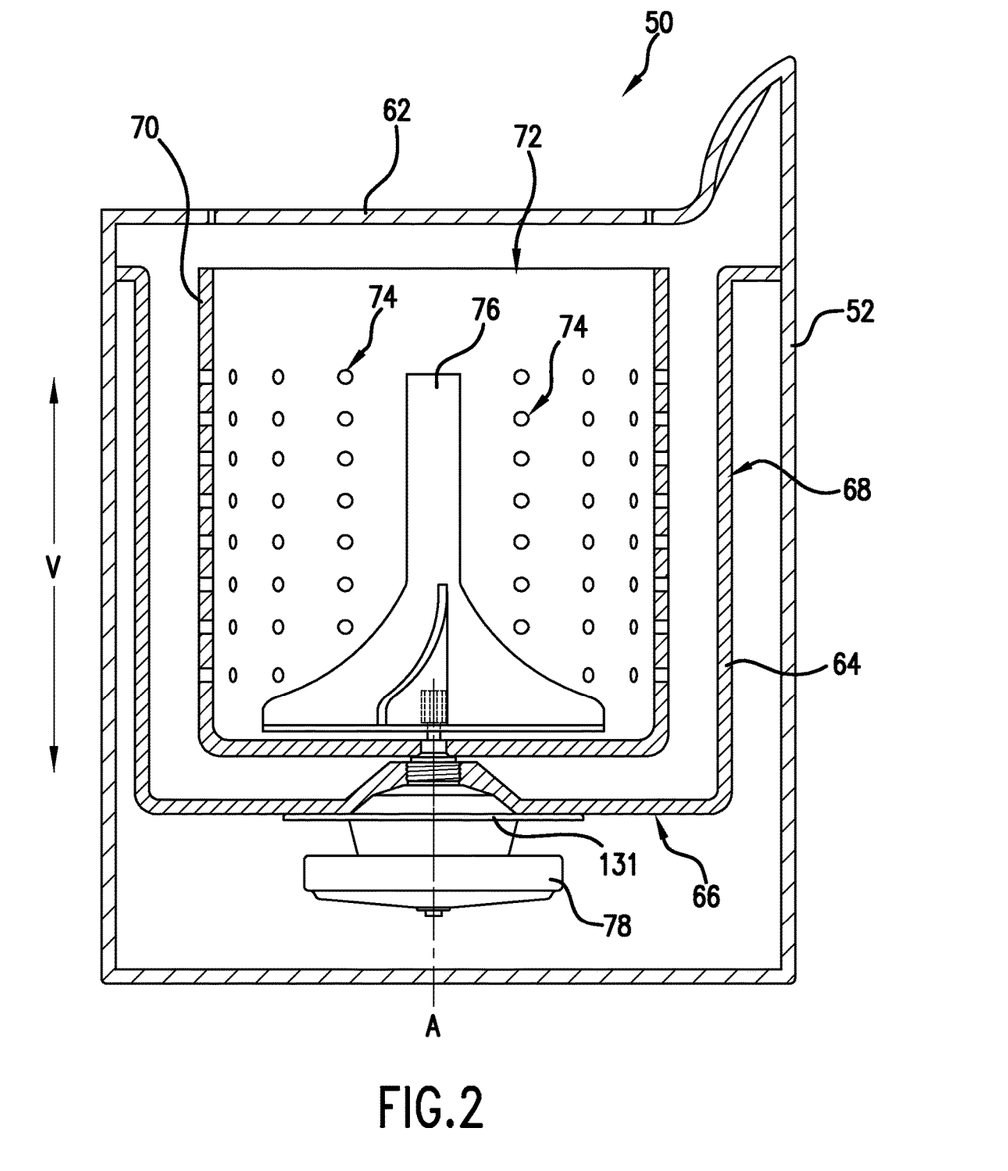
FIG. 2 is a side cross-sectional view of the exemplary embodiment of FIG. 1.

FIG. 1 is a perspective view of an exemplary vertical axis washing machine 50 including a cabinet 52 and a top cover 54. FIG. 2 is a side cross-sectional view of the exemplary embodiment of FIG. 1. A backsplash 56 extends from cover 54, and a control panel 58 including a plurality of input selectors 60 is coupled to backsplash 56. Control panel 58 and input selectors 60 collectively form a user interface input for operator selection of machine cycles and features. For example, in one embodiment, a display 61 indicates selected features, a countdown timer, and/or other items of interest to machine users.

A door or lid 62 is mounted to cover 54 and is rotatable about a hinge (not shown) between an open position (not shown) facilitating access to wash tub 64 located within cabinet 52, and a closed position (shown in FIG. 1) forming an enclosure over wash tub 64. Wash tub 64 includes a bottom wall 66 and a sidewall 68. A basket 70 that is rotatably mounted within wash tub 64. A pump assembly (not shown) is located beneath tub 64 and basket 70 for gravity assisted flow when draining tub 64.

Referring now to FIG. 2, wash basket 70 is movably disposed and rotatably mounted in wash tub 64 in a spaced apart relationship from tub sidewall 68 and the tub bottom 66. Basket 70 includes an opening 72 for receiving wash fluid and a washload therein. Basket 70 includes a plurality of perforations 74 therein to facilitate fluid communication between an interior of basket 70 and wash tub 64.

An agitation element 76, such as a vane agitator, impeller, auger, or oscillatory basket mechanism, or some combination thereof is disposed in basket 70 to impart an oscillatory motion to articles and liquid in basket 70. In different embodiments, agitation element 76 includes a single action element (i.e., oscillatory only), double action (oscillatory movement at one end, single direction rotation at the other end) or triple action (oscillatory movement plus single direction rotation at one end, singe direction rotation at the other end). As illustrated in FIG. 2, agitation element 76 and wash basket 70 are oriented to rotate about a vertical axis A (which is substantially parallel to vertical direction V). Basket 70 and agitator 76 are driven by permanent magnet synchronous motor 78, which operates to turn or rotate agitator 76 and/or basket 70 with tub 64 as will be more fully described below.

Operation of machine 50 is controlled by a controller or processing device (not shown) that is operatively coupled to the user interface input 58 located on washing machine backsplash 56 (shown in FIG. 1) for user manipulation to select washing machine cycles and features. In response to user manipulation of the user interface input 58, the controller operates the various components of machine 50 to execute selected machine cycles and features.

The controller may include a memory and one or more microprocessors, such as a general or special purpose microprocessor operable to execute programming instructions or micro-control code associated with the operating cycles of the washing machine. The memory may represent random access memory such as DRAM, or read only memory such as ROM or FLASH. In one exemplary embodiment, the processor executes programming instructions stored in memory. The memory may be a separate component from the processor or may be included onboard within the processor. The controller may be positioned in a variety of locations throughout the washing machine. The controller is in communication with e.g., control panel 58, motor 78, valves, switches, and/or other components of washing machine 50. By way of example, one or more signal lines or shared communication buses may be used to provide connection.

In an illustrative embodiment, laundry items are loaded into basket 70, and washing operation is initiated through operator manipulation of control input selectors 60 (shown in FIG. 1). Wash tub 64 is filled with water and mixed with detergent to form a wash fluid. The contents of the basket 70 are agitated with agitation element 76 for cleansing of laundry items in basket 70. More specifically, agitation element 76 is moved back and forth in an oscillatory back and forth motion. In the illustrated embodiment, agitation element 76 is rotated clockwise a specified amount about the vertical axis A of the machine, and then rotated counterclockwise by a specified amount. The clockwise/counterclockwise reciprocating motion is sometimes referred to as a stroke, and the agitation phase of the wash cycle constitutes a number of strokes in sequence. Acceleration and deceleration of agitation element 76 during the strokes imparts mechanical energy to articles in basket 70 for cleansing action. The strokes may be obtained in different embodiments with a reversing motor, a reversible clutch, or other known reciprocating mechanism.

After the agitation phase of the wash cycle is completed, tub 64 is drained with the pump assembly. Laundry items are then rinsed and portions of the cycle repeated, including the agitation phase, depending on the particulars of the cleaning process selected by a user. Preferably, basket 70 is held in a fixed position during portions of the wash and rinse cycles while agitator 76 is oscillated as described.

One or more spin cycles may also be used as part of the cleaning process. In particular, a spin cycle may be applied after the wash cycle and/or after the rinse cycle in order to wring wash fluid from the articles being washed. During a spin cycle, basket 70 is rotated at relatively high speeds to help wring fluid from the laundry articles through holes 74.

Figure 3:
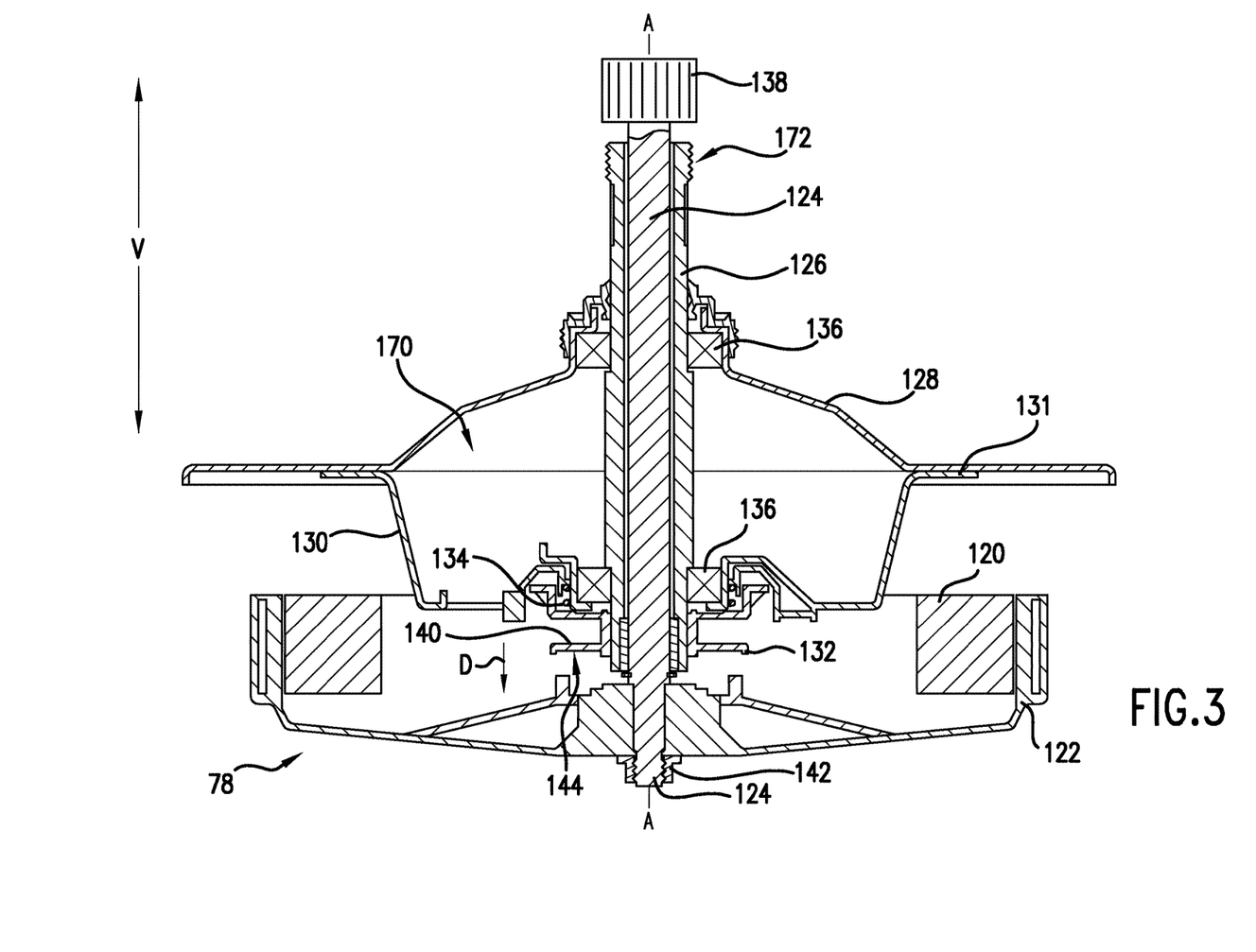

FIG. 3 provides a cross-sectional view of motor 78, which includes stator 120 and rotor 122. When energized with the appropriate power, rotor 122 is caused to rotate while stator 120 remains fixed. Rotor 122 is attached to one end of a shaft or agitator drive element 124 through coupling 142. Agitator drive element 124 extends vertically and is connected with coupling 138 at the end opposite of coupling 142. Coupling 138 attaches agitator drive element 124 to agitator 76.

Stator 120 is attached to a bearing housing 131 formed by lower clam shell 130 attached to upper clam shell 128. The bottom wall 66 of wash tub 64 is attached to upper clam shell 128 of bearing housing 131 (FIG. 1). Bearing housing 131 forms a cavity 170 into which at least a portion of certain components of an exemplary clutch positioning assembly are received as will be further described.

A spin tube or wash basket drive element 126 is concentric with agitator drive element 124. Wash basket drive element 126 is connected with wash basket 70 at threaded end 172. Agitator drive element 124 can rotate within wash basket drive element 126 even if element 126 (and, therefore, wash basket 70) is held in a fixed position. Wash basket drive element 126 can also rotate within upper and lower clam shells 128 and 130 of bearing housing 131, which is mounted on wash basket drive element 126 using a pair of bearings 136. The position of wash basket drive element 126 can be fixed to hold wash basket 70 stationary while agitator 76 is oscillated during e.g., a wash or rinse cycle. Alternatively wash basket drive element 126 and, therefore, wash basket 70 can also be rotated with agitator 76 during a spin cycle.

To selectively control the rotation of wash basket 70, clutch 132 is used to engage and disengage wash basket drive element 126 from rotor 122. In FIG. 3, clutch 132 is shown in an upward, disengaged position in which wash basket drive element 126 is disengaged from rotor 122 such that the rotation of wash basket 70 is prevented while agitator 76 is rotated (e.g., during wash and rinse cycles). In this position, clutch 132 is engaged with bearing housing 131 which is attached to wash tub 64. Conversely, clutch 132 can be shifted downward (arrow D in FIG. 3) to an engaged position shown in FIG. 4 in which wash basket drive element 126 is engaged with rotor 122 such that wash basket 70 and agitator 76 are rotated simultaneously by rotor 122. To return to the position shown in FIG. 3, clutch 132 can be shifted upward (arrow U in FIG. 4).

Figure 4:
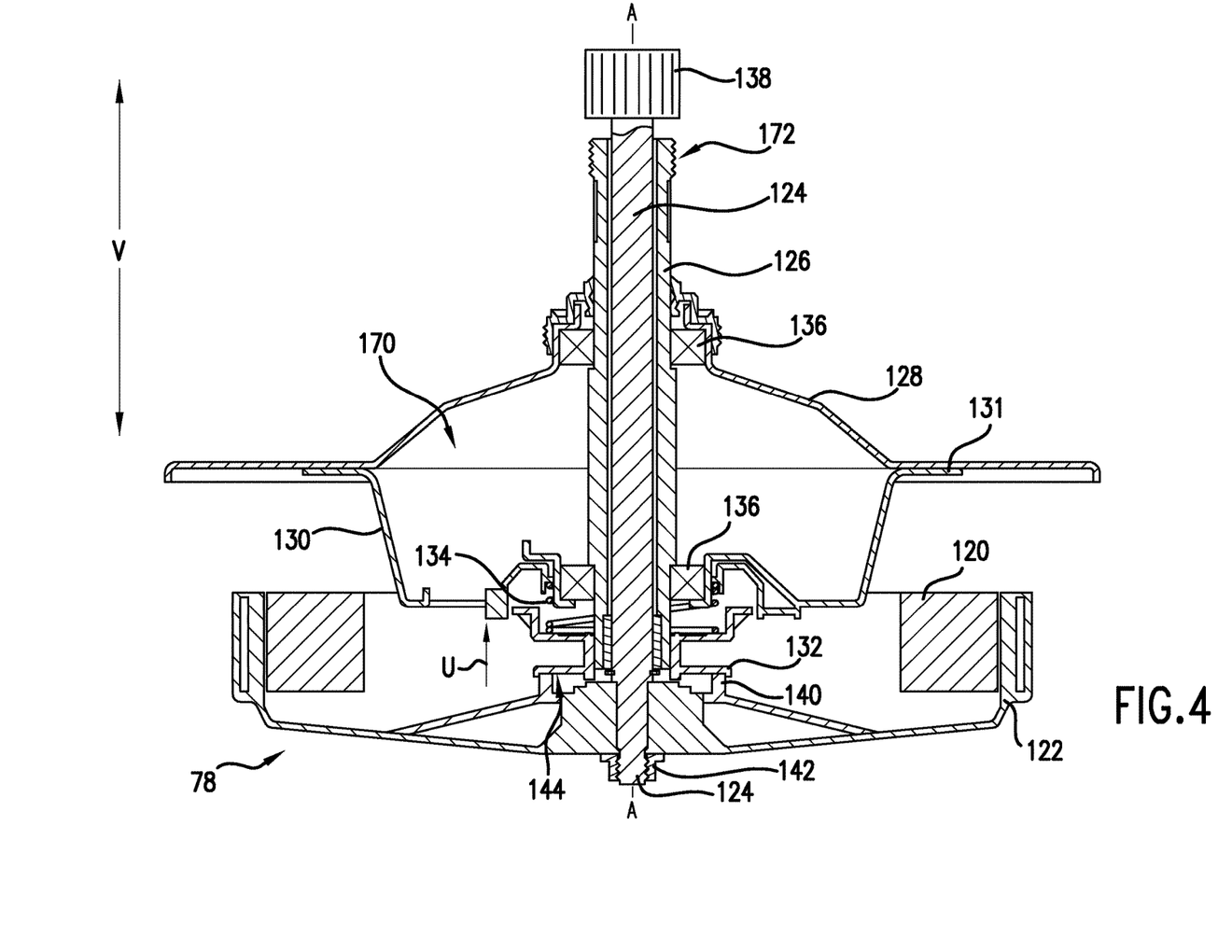
FIG. 4 is a cross-sectional view of the exemplary embodiment of a motor, shaft, and clutch as illustrated in FIG. 3, except that the clutch is shown in a mode that provides for rotation of the wash basket.
Figure 5:
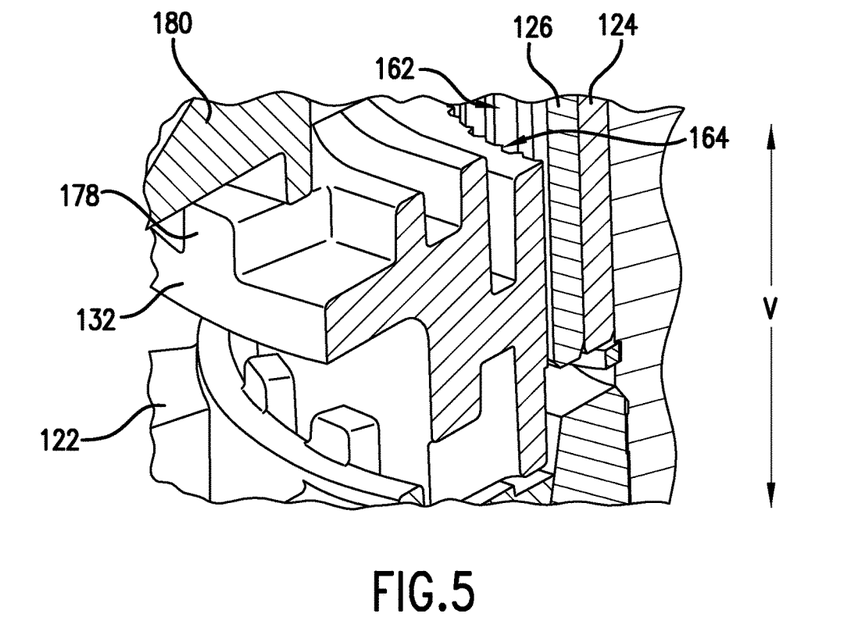
FIG. 5 is a close up, partial cross-sectional view of a portion of an exemplary clutch and other components as may be used with the present invention.
Figure 6:
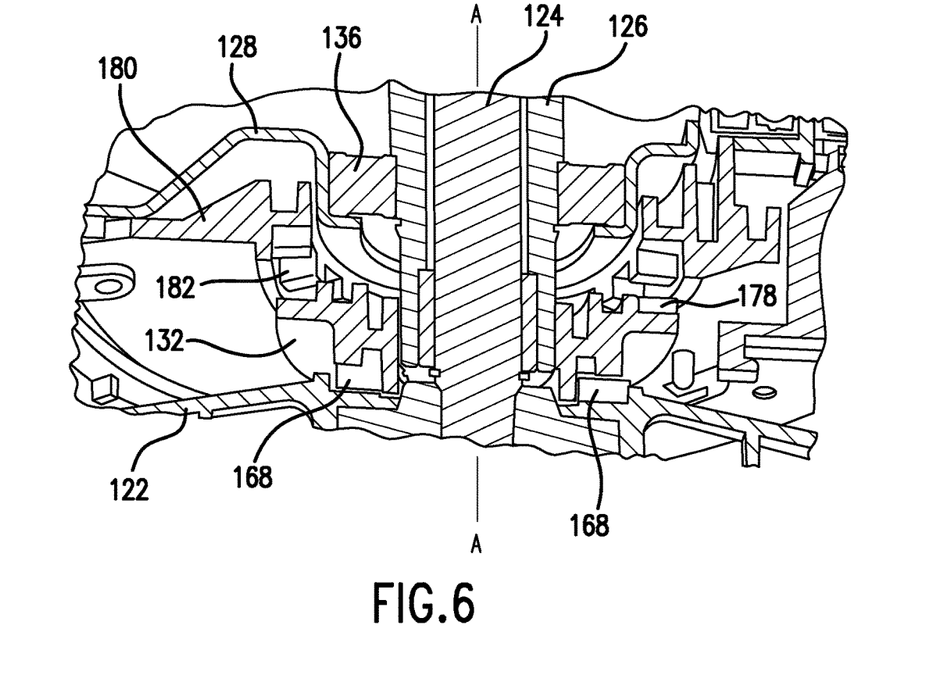
FIG. 6 is a close up, cross-sectional view of a portion of an exemplary clutch and other components as may be used with the present invention. The perspective of the view is at an angle from the plane of the cross-section.

FIG. 5 is a close up, partial cross-sectional view of a portion of the exemplary clutch 132 shown in FIGS. 3 and 4. FIG. 6 is a close up, cross-sectional view of a portion of exemplary clutch 132 albeit at a different angle from that used for FIG. 5. A view of the bottom of clutch 132 is provided in FIG. 7 as well.

As shown, the outside surface of wash basket drive element 126 includes a first plurality of spline teeth 162 oriented along the vertical direction V and positioned circumferentially about element 126. Clutch 132 includes a central opening (FIG. 7) 166 into which the wash basket drive element 126 is slidably received. Clutch 132 defines a second plurality of spline teeth 164 that mesh with spline teeth 162. As shown, teeth 162 and 164 are positioned on opposing sides of clutch 132 along vertical direction V. Accordingly, clutch 132 can shift along the wash basket drive element 126 in vertical direction V while, at the same time, the rotation of clutch 132 will cause wash basket drive element 126 to also rotate.

Clutch 132 also includes a first plurality of clutch teeth 168 along one side and a second plurality of clutch teeth 178 along an opposing side. Clutch teeth 168 mesh with rotor teeth 224 (FIG. 12) on rotor 122 whenever clutch 132 is the engaged position so as to rotate wash basket 70. Conversely, clutch teeth 178 mesh with locking teeth 182 of a platform lock 180 whenever clutch 132 is in the disengaged position so that wash basket 70 is precluded from rotating while agitator 76 is rotated.

Figure 7:
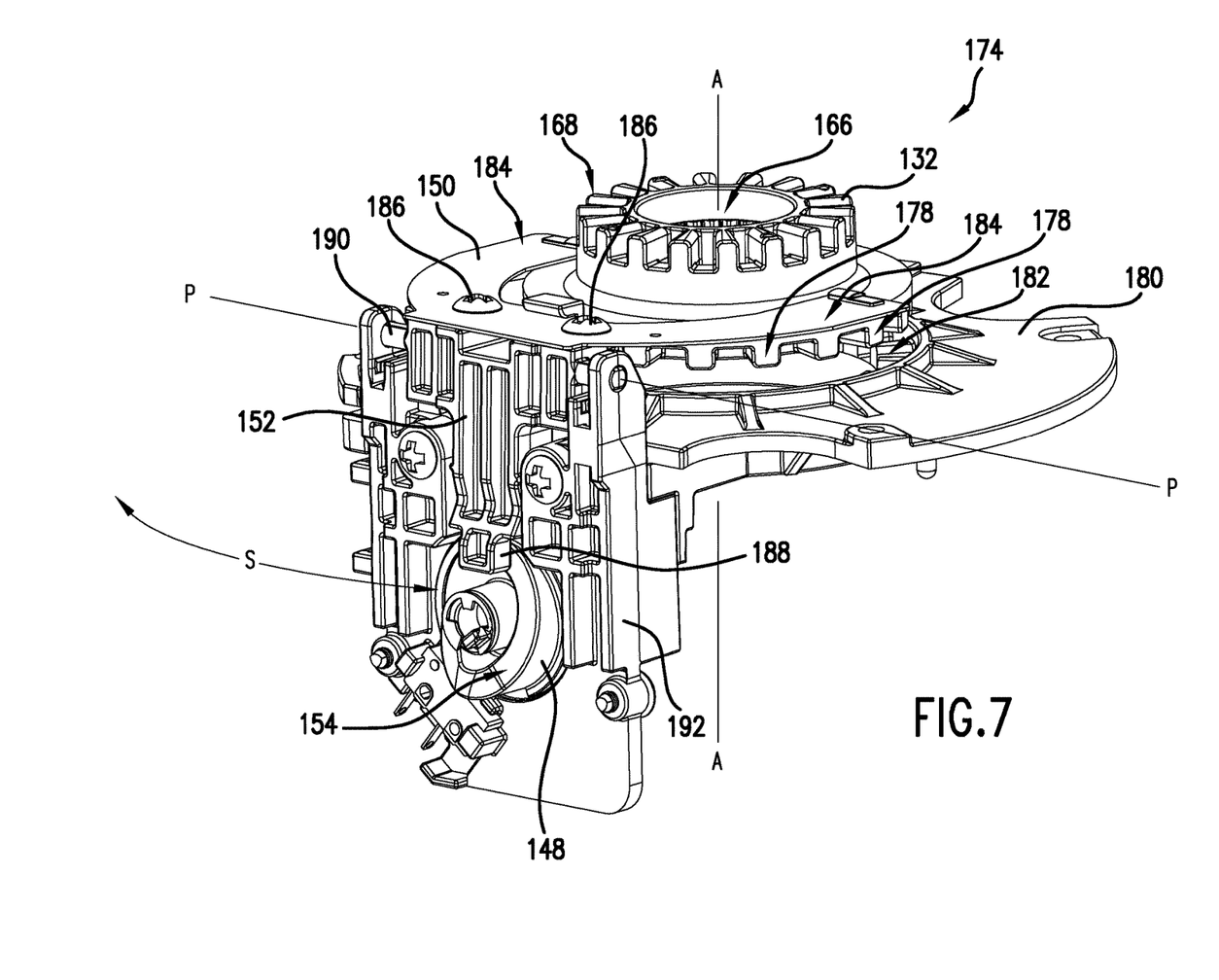
FIGS. 7 and 8 are perspective views of an exemplary embodiment of a clutch positioning assembly with a rotational cam for shifting the clutch shown in FIGS. 3-6 between different modes of operation for a washing machine appliance.
Figure 8:
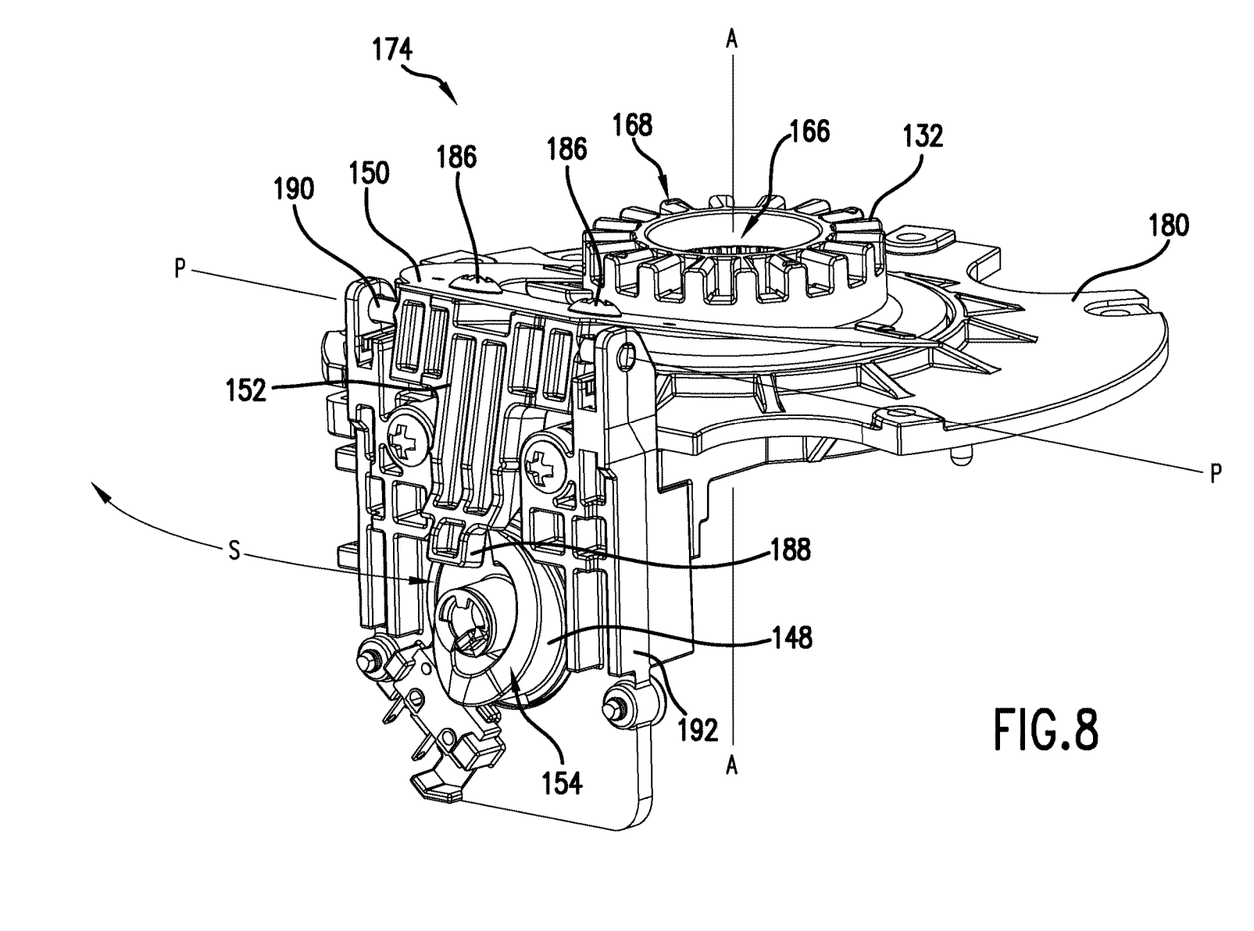
Figure 9:
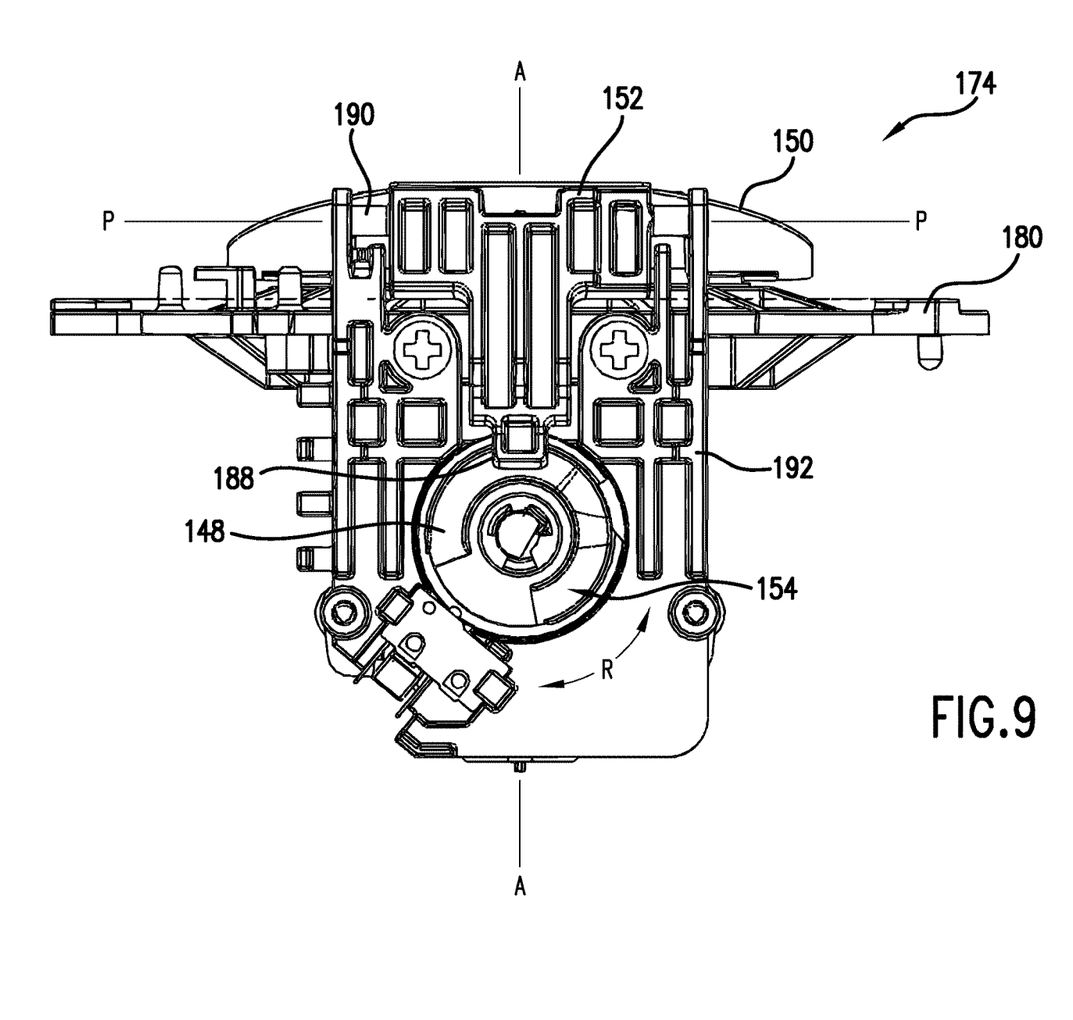
FIG. 9 is an elevation view of the exemplary embodiment of a clutch positioning assembly shown in FIGS. 7 and 8.
Figure 10:
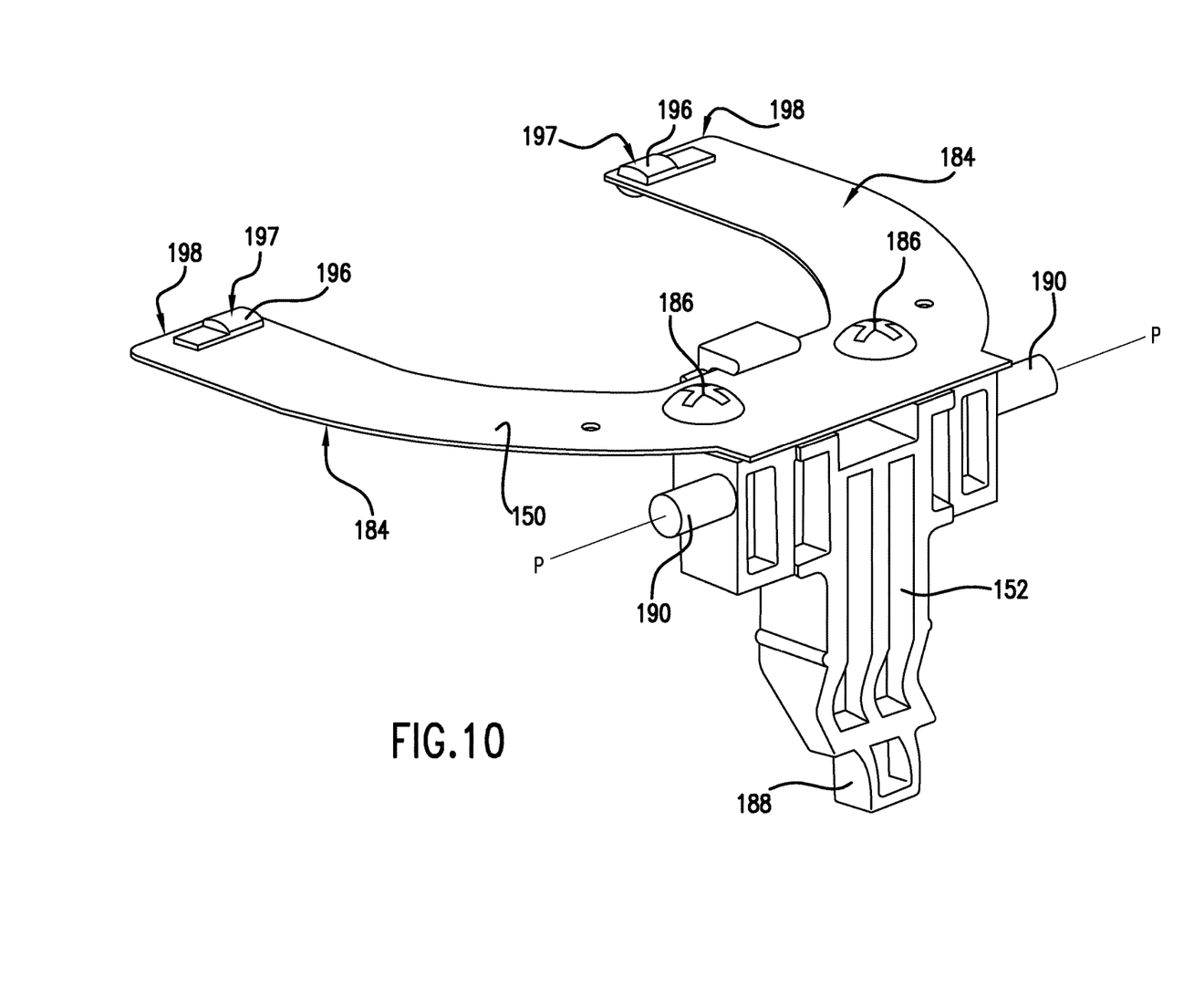
FIG. 10 is a perspective view of certain components of the exemplary clutch positioning assembly of FIGS. 7-9.

FIGS. 7-9 provide exemplary embodiments of a clutch positioning assembly 174 (i.e. a mode shifter) of the present invention. FIG. 10 provides a perspective view where certain components of clutch positioning assembly 174—particularly a yoke 150 and a cam follower 152—as shown in isolation. In FIGS. 7-10, for purposes of additional clarity in describing the invention, assembly 174 is shown in an orientation where clutch 132 is inverted from that which is shown in FIGS. 3-6. Assembly 174 is used to shift clutch 132 along axis A (and vertical direction V) between the engaged and disengaged positions as described to selectively control the mode of operation of wash basket 70 between spinning modes and non-spinning modes such as would be used e.g., with wash, rinse, and spin cycles. Assembly 174 is fixed to bearing housing 131 by connecting platform lock 180 to lower clam shell 130.

As shown, clutch positioning assembly 174 includes a leaf spring or yoke 150 that is in contact with clutch 132. More particularly, yoke 150 includes a pair of arms 184 (FIG. 7) that extend into contact with clutch 132 on opposing sides of the axis of rotation A. For this exemplary embodiment, yoke 150 is Y-shaped as best seen in FIG. 10. Yoke 150 is connected with a cam follower 152 using fasteners 186.

For this exemplary embodiment, yoke 150 with arms 184 can be used to provide a force to push (i.e. lift) clutch 132 in the vertical direction V along axis A. The force provided by yoke 150 causes the second plurality of clutch teeth 178 to mesh with locking teeth 182 of the platform lock 180 when assembly 174 is operated to move clutch 132 from the engaged position to the disengaged position. In addition, yoke 150 can absorb vibrations of clutch 132 that may occur as it is engaged or disengaged from rotor 122.

Also, if clutch teeth 178 and locking 182 are not properly aligned with each other, tooth on tooth contact can occur that prevents proper meshing. As such, it may be necessary to jog or partially rotate rotor 122. As such jogging occurs, yoke 150 uses arms 184 to contact clutch 132 on opposing sides of axis A to provide a force against clutch 132 on the opposing sides of axis A. This force moves clutch 132 into position once clutch teeth 178 are properly aligned with locking teeth 182. In one exemplary embodiment, yoke 150 provides a force in the range of e.g., 5 to 15 pounds along vertical direction V. Yoke 150 can be constructed by stamping a metal such as e.g., a full hardened 301 stainless steel. Other materials and/or embodiments may be used as well.

As best seen in FIG. 10, yoke 150 includes multiple pads 196 positioned at the distal ends 198 of the arms 194 of yoke 150. Pads 196 have a smooth, curved surface 197 for contact with clutch 132. Pads can be constructed from e.g., a plastic material. As such, pads 196 help prevent wear that can occur from metal on metal contact and also provide for a positive determination of the location where arms 184 will contact clutch 132.

Cam follower 152 includes a finger 188 that rides on a curved and inclined surface 154 of rotatable cam 148. A motor (not shown) can be used to selectively rotate cam 148 in either direction as shown by arrow R in FIG. 9. The motor can be e.g., operably connected with the controller of washing machine 50. Cam 148 includes a curved, inclined surface 154. As the motor rotates cam 148, finger 188 of cam follower 152 rides inclined surface 154, which causes finger 188 to shift outwardly or inwardly (arrows S) depending upon the direction of rotation of cam 148. For example, in FIG. 7 finger 188 of cam follower 152 has moved towards the axis of rotation A while in FIG. 8 finger 188 has moved away from axis of rotation A. For the exemplary embodiment shown in the figures, the axis of rotation of cam 148 is substantially perpendicular to axis A.

As finger 188 so moves based on the rotation of cam 148, cam follower 152 and yoke 150 pivot about a pivot axis P. More specifically, a pair of pins 190 extend in an opposing manner from the sides of cam follower 152. Pins 190 are rotatably received into a frame 192 that is attached to platform lock 180. Cam follower 152 and yoke 150 are pivotable about the pivot axis P provided by pins 190. In an alternative embodiment, pins 190 can be replaced by a shaft or axle that extends through cam follower 152 and received on opposing ends by frame 192. Accordingly, the movement of finger 188 along the direction of arrows S also causes yoke 150 to shift the position of clutch 132 vertically along the axis of rotation A.

Accordingly, in FIG. 7, finger 188 has been moved towards axis of rotation A such that yoke 150 is moved vertically along the axis of rotation A away from platform lock 180. As a result, clutch 132 is also moved vertically along the axis of rotation A away from platform lock 180 to an engaged position where teeth 168 will contact teeth on rotor 122 of motor 78 so as to rotate wash basket 70. The movement of clutch 132 is assisted by a clutch spring 134 (FIGS. 3 and 4) positioned between clutch 132 and platform lock 180. More particularly, clutch spring 134 is used to urge clutch 132 towards the engaged position.

Conversely, in FIG. 8, finger 188 has been moved away from the axis of rotation A such that yoke 150 urges clutch 132 vertically along the axis of rotation A towards platform lock 180. As a result, teeth 178 of clutch 132 engage teeth 182 of platform lock 180 so that clutch 132 is now in a disengaged position and wash basket 70 is prevented from rotating with agitator 76. Thus, clutch spring 134 and the arms of yoke 150 contact clutch 132 in an opposing manner. For example, clutch spring 134 urges clutch 132 downwardly along vertical direction V while the arms 184 of yoke 150 urge clutch 132 in an opposing direction along vertical direction V.

Figure 11:
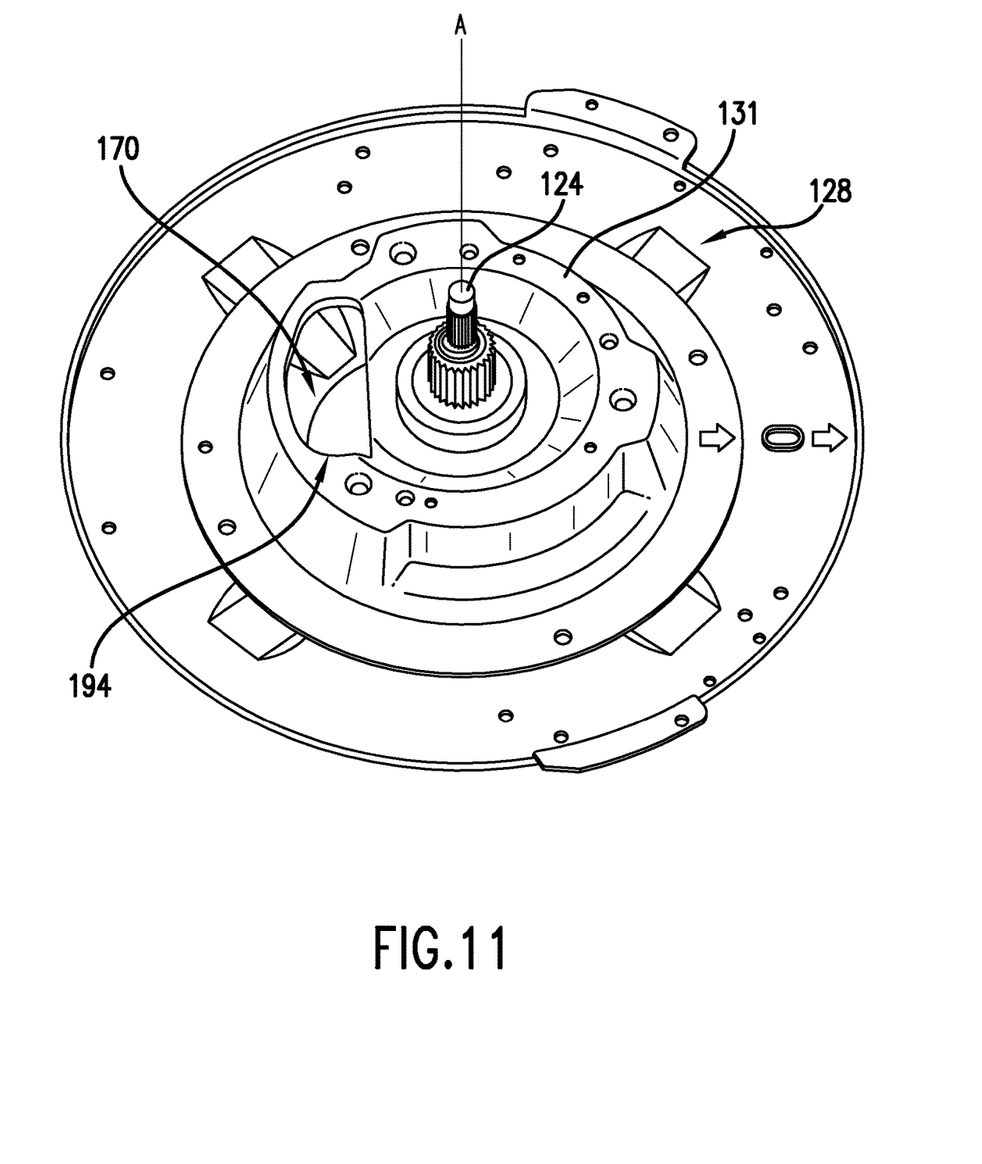
FIG. 11 is a perspective view of an exemplary embodiment of a bearing housing as may be used with the washing machine appliance of e.g., FIGS. 1 and 2.

FIG. 11 shows a view of the bottom wall 66 of wash tub 64 with bearing housing 131 attached as shown. During manufacturing of appliance 50, housing 131 provides an opening 194 through which at least a portion of clutch positioning assembly 174 can be received into cavity 170. As such, motor 78 and clutch positioning assembly 174 can be provided as a single, modular unit for connection with housing 131 so as to improve the efficiency of the manufacturing process.

Returning to FIG. 2, as previously stated, clothes or other articles placed in wash tub 64 may create a torque on wash basket 70 and/or agitator 76. Depending on the position of clutch 132, this torque can increase the frictional force between clutch teeth 168 and rotor teeth 224—or between clutch teeth 178 and locking teeth 182. The force provided by e.g., yoke 150 or clutch spring 134 may not be sufficient to overcome these frictional forces.

To release clutch 132, the controller of washing machine 50 may be programmed to jog or bump rotor 122 so as partially rotate or jostle clutch 132 and release it from either the platform lock 180 or rotor 122. However, after such jogging, clutch 132 may no longer be properly aligned to engage rotor 122 or platform lock 180. For example, when switching to spin mode and after jogging to release clutch 132 from platform lock 180, clutch teeth 168 may not be properly aligned with rotor teeth 224. Conversely, when switching to e.g., wash mode and after jogging to release clutch 132 from rotor 122, clutch teeth 178 may not be properly aligned with locking teeth 182.

As used herein, "aligned" or "aligning" in reference to the clutch teeth means that the clutch 132 is in a position where its teeth will properly mesh with the teeth of either rotor 122 or platform lock 180 (depending upon which mode of operation is desired). For example, when aligned, clutch teeth 168 will shift in the gaps between rotor teeth 224. When not properly aligned, instead of meshing, tooth on tooth contact occurs that prevents proper engagement between clutch 132 and rotor 122 or between clutch 132 and platform lock 180. For example, when not aligned, clutch teeth 168 will impact rotor teeth 224 rather than allowing clutch teeth 168 to fall into the gaps between rotor teeth 224. As stated previously, if motor 78 is activated when clutch 132 is not properly engaged, washing machine 50 may be damaged. For example, if motor 78 begins rotating at high speed before clutch 132 is engaged with rotor 122, clutch 132 may be destroyed if it attempts to engage with motor 78.

Figure 12:
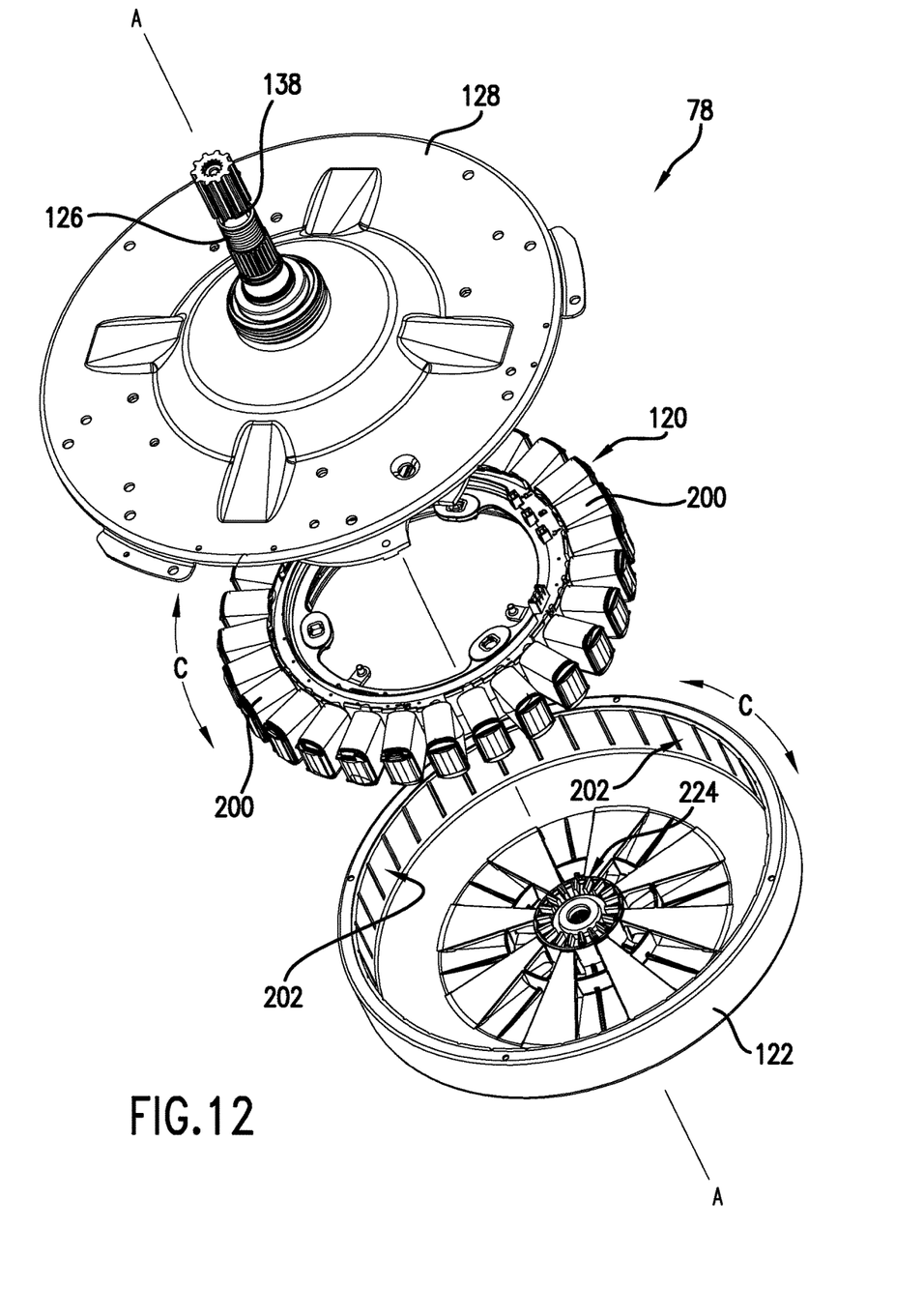
FIG. 12 is a exploded perspective view of an exemplary rotor, stator, and bearing housing of the present invention.
Figure 13:
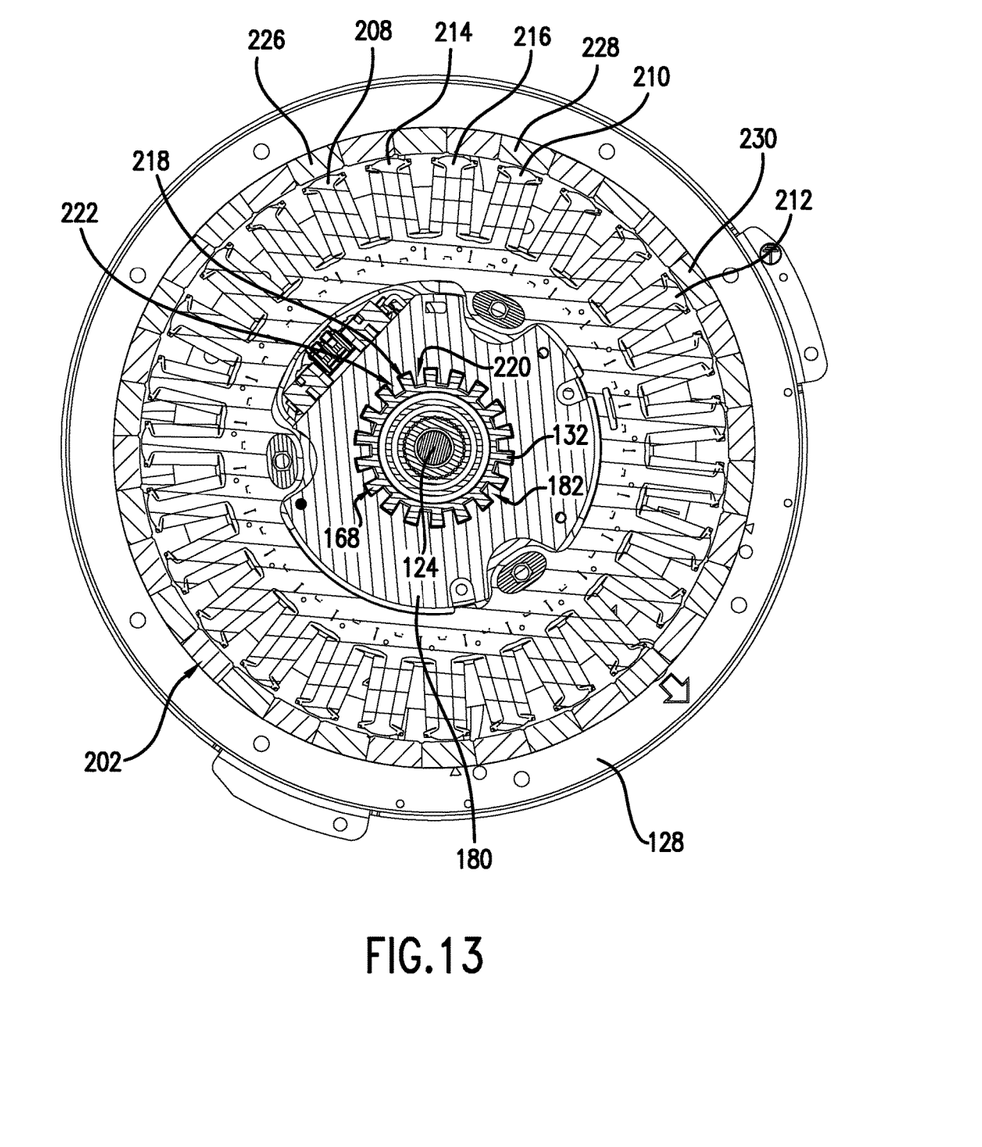
FIG. 13 is a cross-sectional view of an exemplary clutch, motor, and platform lock of the present invention.

In order to prevent such damage, the controller of washing machine 50 is programmed to align clutch 132 for either properly engaging with rotor 122 or locking into place with platform lock 180. Referring now to FIGS. 12 and 13, as shown, rotor 122 includes a plurality of magnets 202 positioned about circumferential direction C of rotor 122. Magnet 202 alternates in polarity along circumferential direction C i.e. north, south, north, south, etc. Magnets 202 rotate with rotor 122. For example, in one exemplary embodiment, thirty-six magnets 202 can be provided with eighteen having their north poles facing the axis of rotation A and eighteen having their south poles facing the axis of rotation A—all in an alternating manner. Other numbers may be used as well.

Stator 120 includes a plurality of coils 200. For example, coils 200 are constructed from windings of copper wire. When energized or activated, coils 200 create a magnet field that interacts with magnets 202 so as to cause rotor 122 to rotate about axis A. Depending on the position of clutch 132, these rotations provide e.g., a wash, rinse, or spin mode of washing machine 50.

The controller of washing machine 50 is configured to energize one or more individual coils 200. Referring now to the cross-sectional view of FIG. 13, the controller can energize every third coil. For example, coils 208, 210, 212, etc. are energized in that they are provided with a current that creates an electromagnetic field. This field is of sufficient strength to rotate rotor 122 and align the coils with magnets 202. As shown in FIG. 13, for example, coil 208 is aligned with magnet 226, coil 210 is aligned with magnet 228, and coil 212 is aligned with magnet 230, etc. It should also be understood that instead of energizing every third coil, any combination of every three sets of coils could also be used to rotate the rotor 122 to a known position.

The position of stator 120 with coils 200 is fixed relative to platform lock 180 as the two cannot rotate relative to each other. As such, the position of the locking teeth 182 of platform lock 180 relative to coils 200 is known. Similarly, the position of magnets 202 relative to the rotor teeth 224 (FIG. 12) is known as both are fixed to, and carried by, rotor 122. Consequently, when every third coil (208, 210, 212, etc.) is energized as shown in FIG. 13 so as to rotate rotor 122 and align certain magnets 202 with these coils, the position of rotor teeth rotor 122 relative to the locking teeth of platform lock 180 is also known.

Accordingly, in order to spin basket 70 and agitator 76, clutch 132 must be properly engaged with rotor 122. The controller energizes every third coil (208, 210, 212, etc.) as shown in FIG. 13 so as to rotate rotor 122 and align certain magnets (226, 228, and 230, etc.) with these coils. This also aligns the rotor teeth 224 on the rotor 122 with the clutch teeth 168 on the clutch 132. Clutch positioning assembly 174 is then activated so as to allow yoke 150 to shift clutch 132 along the axis of rotation A towards the rotor 122 of motor 78 with the assistance of clutch spring 134. In the event clutch 132 is under a torque from e.g., clothes in wash basket 70, motor 78 can be jogged to release clutch 132 from locking teeth 182, and then coils 208, 210 and 212 can be energized to ensure the alignment of clutch teeth 168 with rotor teeth 224 before shifting clutch 132 into position.

Conversely, in order to lock wash basket 70 into place and allow agitator 76 to rotate, clutch 132 must be disengaged from rotor 122 and locked into platform lock 180. Accordingly, the controller energizes every third coil (208, 210, 212, etc.) (or a predetermined combination of sequential sets of three coils) as shown in FIG. 13 so as to rotate rotor 122 and align certain magnets (226, 228, and 230, etc.) with these coils. The rotation of rotor 122 also rotates clutch 132 and aligns the second plurality of clutch teeth 178 with locking teeth 182. For example, as shown in FIG. 13, once coil 208 is aligned with magnet 228, clutch tooth 218 is also aligned with magnet 228. Furthermore, clutch teeth 178 are now aligned with locking teeth 182 such that e.g., clutch tooth 218 will fit into the gap between locking teeth 220 and 222. Clutch positioning assembly 174 is then activated so as to allow yoke 150 to shift clutch 132 along the axis of rotation A towards the platform lock 180. In the event clutch 132 is under a torque from e.g., clothes in wash basket 70, motor 78 can be jogged to release clutch 132 from rotor teeth 224, and then coils 208, 210 and 212 can be energized to ensure the alignment of clutch teeth 178 with locking teeth 182 before shifting clutch 132 into position.

The embodiment shown in the figures is by way of example only. Other configurations of clutch 132, motor 78, and platform lock 180—with different numbers of teeth and magnets may also be used. In addition, the relative position of each along circumferential direction C relative to each other may also be varied provided their relative positions are known when one or more coils 200 are activated as discussed above. By way of example, rotor 122 can equipped with X magnets, where X is an integer greater than or equal to 2. As such, the number of clutch teeth Y in the first plurality of clutch teeth 168 should meet the following requirement $$Y=(X/2)*n, \quad (1)$$

wherein n is any positive integer.

The number of teeth in the second plurality of clutch teeth 178, the number of rotor teeth 224, and the number of locking teeth 182 should also equal Y. Numerous examples can be provided as will be understood by one of skill in the art using the teachings disclosed herein.

An exemplary method of the present invention has been described above in which every third coil of the stator is aligned with a magnet carried by the rotor. Using the teachings disclosed herein, one of skill in the art will understand that other exemplary methods of the present invention may be used as well in order to align the clutch teeth for spin or wash modes. For example, the one or more coils carried by the stator could be energized (including e.g., energizing at different amounts) such that the rotor is oriented into a known position but not necessarily one in which every third coil is aligned with a magnet. Instead, the coils could be positioned at locations between the magnets—i.e. in a manner not aligned with a magnet. This could be accomplished e.g., by energizing all the coils on the stator but at different levels. Other methods could be used as well. Regardless, by knowing the relative angular position of the coils relative to the rotor teeth once the rotor is locked into a position, the coils can be energized in a manner or sequence that orients the rotor so as to allow for the clutch to be properly engaged and disengaged between wash and spin modes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a washing machine appliance, the appliance including locking teeth having a fixed position, a motor comprising a stator with a plurality of coils, a rotor with a plurality of magnets and a plurality of rotor teeth, a clutch having opposing sides along the axial direction and that includes a first plurality of clutch teeth along one of the opposing sides and a second plurality of clutch teeth along the other opposing side, the clutch also being-slidable along an axis of rotation defined by the rotor, the method comprising:
    energizing at least one coil of the plurality of coils of the stator so as to rotate the rotor to a position where the at least one coil is aligned with at least one magnet of the plurality of magnets carried by the rotor;
    holding the rotor at a position where the at least one coil is aligned with at least one magnet of the plurality of magnets carried by the rotor while the at least one coil is energized;
    aligning a plurality of rotor teeth on the rotor with the first plurality of clutch teeth by the energizing and the holding;
    sliding the clutch along the axis of rotation of the motor so as to engage the first of plurality of clutch teeth with the plurality of rotor teeth;
    re-energizing one or more of the plurality of coils of the stator while the first plurality of clutch teeth are engaged with the plurality of rotor teeth;
    positioning the rotor during the re-energizing so as to align the second plurality of clutch teeth with the locking teeth;
    holding the rotor during the re-energizing and after the positioning so as to maintain alignment of the second plurality of clutch teeth with the locking teeth while the first plurality of clutch teeth are engaged with the plurality of rotor teeth; and
    sliding the clutch along the axis of rotation so as to engage the second plurality of clutch teeth with the locking teeth.

2. The method for operating a washing machine appliance as in claim 1, further comprising jogging the motor so as to release the first plurality of clutch teeth from the plurality of rotor teeth.

3. The method for operating a washing machine appliance as in claim 2, further comprising jogging the motor so as to release the second plurality of clutch teeth from the plurality of locking teeth of the appliance.

4. The method for operating a washing machine appliance as in claim 1,
    wherein the plurality of magnets of the rotor comprises X magnets that are circumferentially spaced about the axis of rotation of the motor wherein X is an integer and X is ≥2; and
    wherein the first plurality of clutch teeth comprises Y teeth with Y=(X/2)* n, where n is any positive integer.

5. The method for operating a washing machine appliance as in claim 1,
    wherein the plurality of magnets of the rotor comprises thirty-six magnets that are circumferentially spaced about the axis of rotation of the rotor with the polarity arranged in an alternating manner; and
    wherein the first plurality of clutch teeth comprises thirty-six teeth and the plurality of rotor teeth comprises thirty-six teeth.

6. A method for operating a washing machine appliance, the appliance including locking teeth having a fixed position, a motor comprising a stator with a plurality of coils, a rotor with a plurality of magnets and a plurality of rotor teeth, a clutch having opposing sides along the axial direction and that includes a first plurality of clutch teeth along one of the opposing sides and a second plurality of clutch teeth along the other opposing side, the clutch also being-slidable along an axis of rotation defined by the rotor, the method comprising:
    energizing one or more of the plurality of coils of the stator while the first plurality of clutch teeth are engaged with the plurality of rotor teeth;
    positioning the rotor during the energizing so as to align the second plurality of clutch teeth with the locking teeth;
    holding the rotor during the energizing and after the positioning so as to maintain alignment of the second plurality of clutch teeth with the locking teeth while the first plurality of clutch teeth are engaged with the plurality of rotor teeth; and
    sliding the clutch along the axis of rotation so as to engage the second plurality of clutch teeth with the locking teeth.

7. The method for operating a washing machine appliance as in claim 6, further comprising jogging the motor so as to release the first plurality of clutch teeth from the rotor teeth.

8. The method for operating a washing machine appliance as in claim 7, wherein the energizing comprises energizing at least one coil of the stator so as to rotate and hold the rotor at a position where the coil is aligned with at least one magnet carried by the rotor.

9. The method for operating a washing machine appliance as in claim 6, further comprising:
jogging the motor so as to release the first plurality of clutch teeth from the plurality of rotor teeth; and
sliding the clutch along the axis of rotation so as to disengage the clutch from the rotor.

10. The method for operating a washing machine appliance as in claim 9, further comprising:
re-energizing at least one coil of the stator so as to rotate and hold the rotor at a position where the coil is aligned with at least one magnet carried by the rotor;
positioning the rotor during the re-energizing so as to align the first plurality of clutch teeth with the plurality of rotor teeth while the second plurality of clutch teeth are engaged with the locking teeth;
holding the rotor during the re-energizing and after the positioning so as to maintain alignment of the first plurality of clutch teeth with the plurality of rotor teeth while the second plurality of clutch teeth are engaged with the locking teeth; and
sliding the clutch along the axis of rotation so as to engage the first plurality of clutch teeth with the plurality of rotor teeth.

11. The method for operating a washing machine appliance as in claim 6, wherein the plurality of magnets of the rotor comprises X magnets that are circumferentially spaced about the axis of rotation; wherein X is an integer and X is ≥2; and wherein the first plurality of clutch teeth comprises Y teeth with Y=(X/2)* n, where n is any positive integer.

12. The method for operating a washing machine appliance as in claim 6, wherein the plurality of magnets of the rotor comprises thirty-six magnets that are circumferentially spaced about the axis of rotation with the polarity arranged in an alternating manner; and wherein the first plurality of clutch teeth comprises thirty-six teeth and the plurality of rotor teeth comprises thirty-six teeth.

* * * * *